Figure 1:
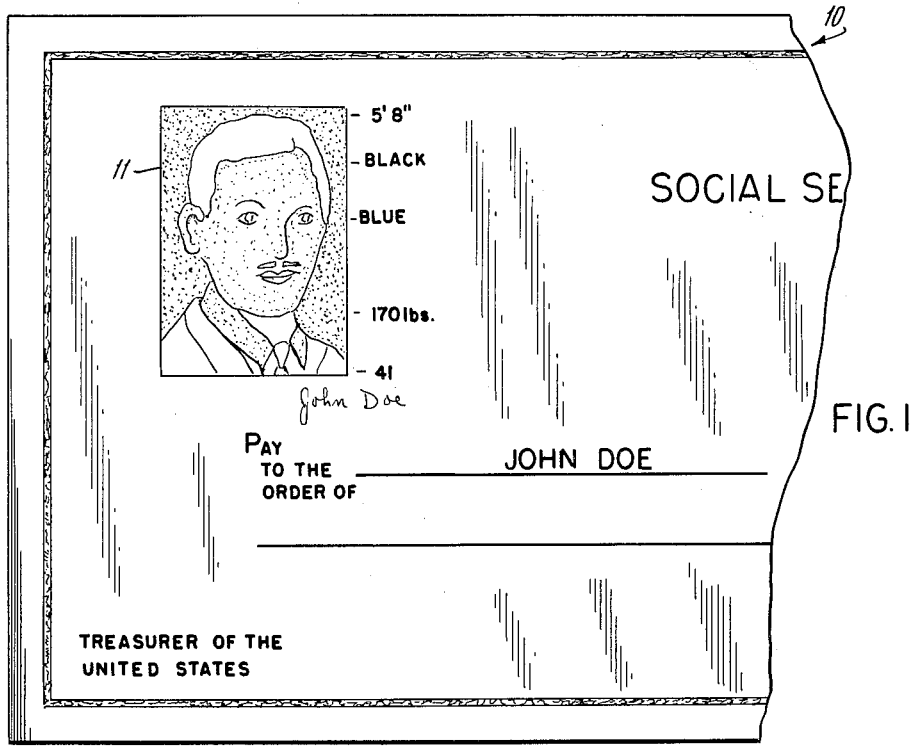

Aug. 7, 1962 W. J. CAVANAUGH ET AL 3,048,697
METHOD OF IDENTIFYING A PERSON
Filed Oct. 20, 1958

INVENTORS
William J. Cavanaugh
Traugott Tschudi
BY
AGENT

United States Patent Office 3,048,697
Patented Aug. 7, 1962

3,048,697
METHOD OF IDENTIFYING A PERSON
William J. Cavanaugh, 105 N. State St., Dover, Del., and Traugott Tschudi, Flushing, N.Y.; said Tschudi assignor to said Cavanaugh
Filed Oct. 20, 1958, Ser. No. 768,481
3 Claims. (Cl. 250—71)

The present invention relates to a method and means for preventing the fraudulent use of negotiable instruments and other papers identifying a person. More particularly, it relates to a method and means for readily identifying the bearer or drawer of a valuable instrument and to valuable instruments carrying identifying images visible only when exposed to ultraviolet radiation.

Fraudulent cashing of checks by persons other than the payee indicated on the check runs possibly into hundreds of millions of dollars per year. During recent years, literally millions of people have been brought under the coverage of public or private assistance and/or pension programs, which means that they receive checks from the same source at regular intervals, for instance each week or month. Losses due to the cashing of such public assistance, social security or other pension checks by an unauthorized person are particularly grievous.

The use of credit cards has also become widespread. Thus, millions of such cards are issued, for instance, by gasoline companies so that they may be presented by the driver at any of the company's gas stations across the country. Such cards are also issued to members of diner's clubs, by hotel chains, department stores and other businesses extending credit to their customers. Losses due to the fraudulent presentation of such credit cards by persons to whom they were not originally and rightfully issued run very high.

Banks and other places of business which regularly accept negotiable instruments, such as checks or credit cards, have long looked for a ready and cheap method of identifying the person mentioned on the instrument as the drawer, payee or owner, depending on the circumstances. Thus, when a check is cashed, it would be advantageous to be able readily to identify the bearer or payee of the check with the person who cashes it. When a credit card is presented, it would be equally advantageous to be able to be certain that the person who presents it is the rightful owner of the card.

Accordingly, it is the primary object of the present invention to provide a method and means for establishing the ready identification of a person whose name appears on a valuable instrument, either as its owner, its drawer or its payee.

Invisible dyes and inks which become visible or fluoresce under ultraviolet light have been used to treat checks, bank notes, bonds and other negotiable instruments so that fraudulent alterations of the instrument may be detected under ultraviolet radiation.

In accordance with the present invention, a "negative" likeness of the face of a person whose name appears on a negotiable or non-negotiable instrument is imprinted on the instrument in an invisible ink which becomes visible under ultraviolet radiation. When such an instrument is presented, it need only be exposed to an ultraviolet black light and a "positive" likeness of the imprinted face will become visible, thereby making identification possible at a mere glance.

If desired, the invisible imprint of the person's likeness may be combined with that of his facsimile signature and/or with a short personal description to facilitate identification still further.

The term "instrument" is used throughout the specification and claims to identify any valuable paper, such as checks, credit cards, bonds, stocks, notes, licenses, identification cards and like negotiable and non-negotiable instruments.

The term "invisible ink" is used throughout the specification and claims to identify any ink which is invisible in ordinary light rays but becomes visible or fluoresces in ultraviolet light. Such inks being known, the present invention is not concerned with any specific ink composition but merely with the use of such inks for imprinting "negative" portraits on a negotiable instrument.

The term "negative likeness" is used throughout the specification and claims to designate any facial image (whether photographed or drawn) wherein the light or skin areas of the face appear in dark shades while the relatively dark areas appear in light shades, as in a photographic negative print.

The "person whose name appears" on the instrument may be any person whose identification would prevent the fraudulent use of the instrument. Thus, it may be the maker and/or the payee of a check or a note, the owner of a bond or stock, or the holder of a credit card.

Since invisible ink fluoresces or shows up light under ultraviolet radiation, the importance of printing the likeness in "negative" for ready and proper identification will become apparent upon consideration of the following facts:

If the print is positive, i.e. the normally dark areas, such as the hair, the eyes or the mouth, are more or less solidly inked, the inked areas will appear light when illuminated by ultraviolet radiation while the light areas free of ink, such as the cheeks, the forehead and the chin, will appear dark. In other words, a "positive" imprint in invisible ink will give a "negative" picture when viewed under ultraviolet radiation. A readily identifiable, positive picture can be had only if the imprint is negative so that the hair and other naturally dark areas remain free or relatively free of invisible ink while the like facial features are inked more or less heavily so that they fluoresce and appear light when exposed to ultraviolet light.

Figure 2:
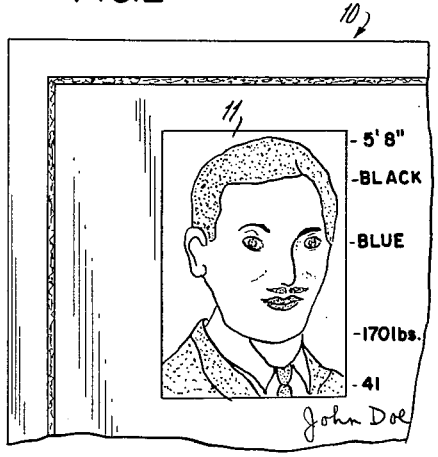
Figure 3:
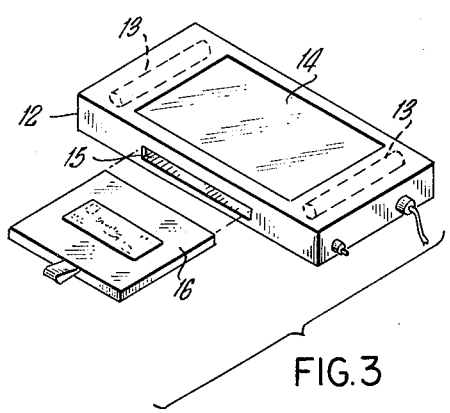

The above and other advantages and features of the present invention will be more fully understood with reference to the following detailed description of a preferred embodiment thereof, taken in conjunction with the drawing wherein FIG. 1 is a top view of a check carrying in the left-hand corner a "negative" portrait, together with other identifying data;

FIG. 2 is a view similar to that of FIG. 1, showing a "positive" portrait under ultraviolet light; and FIG. 3 shows a light box containing an ultraviolet light source for viewing the check of FIG. 1.

Referring to the drawing wherein like reference numerals refer to like parts in all figures, check 10 is shown to carry in its left-hand corner a negative imprint 11, in invisible ink, of a photograph of the payee. While the picture and identifying marks in the left-hand corner cannot normally be seen, they are shown here visibly for purposes of illustrating the invention. As shown, the light parts of the photograph, such as the skin portions of the face, the shirt and the background, are more or less heavily inked while the dark parts, such as the hair, the mustache, the eyes, the eyebrows, the tie and the suit, are lightly inked or not inked at all, giving the same appearance as a negative of a photograph. To show the difference and the effective identification provided by the invention, FIG. 2 shows the same picture in the "positive" image produced by exposing the invisible print to ultraviolet light.

The invisible portrait may be made visible, i.e. the invisible ink may be made to fluoresce, by exposing the check to any suitable source of ultraviolet radiation. For instance and merely by way of example, a light box 12, such as shown in FIG. 3, may be provided and may, if desired, be built flush into the desk or counter of a bank teller. Quartz bulbs 13 emitting ultraviolet light may be mounted in the box beneath a quartz glass or like plate 14. A slot 15 may be provided in the box, together with a support plate 16 upon which the check may be placed for exposure to the ultraviolet radiation. When the ultraviolet light is put on, it will remain invisible to the eye but it will show portrait 11 positively.

If desired, it is possible to improve the ready identification of the person by adding printed identification data to the picture, as shown in FIG. 1 where the height, color of hair and eyes, weight and age of the pictured individual are printed in invisible ink next to the portrait. Also, as shown, a facsimile signature of the payee may be so imprinted for comparison with the endorsement on the check. The latter means of identification will be helpful if the check is not cashed by the payee personally but properly endorsed by him.

Obviously, the invisible ink imprint may be effected by stamping or by a suitable printing process, such as letterpress printing, lithography, intaglio or silk screen printing. All of these printing processes may be carried out by the use of a halftone screen, which is prepared photographically. While the likeness or portrait will normally be taken from a photograph, it could obviously also be an artist's rendering in pen and ink, crayon, charcoal, water or oil colors, pastel or any other artist's medium. Also, the negative likeness could be manually engraved on wood, copper or steel to make cuts, or it could be drawn directly on the lithographic stone or plate. In practice, letterpress or offset printing are most likely to be used for rapid and economic reproduction. For instance, a coarse screen halftone block with about 65 lines per inch, as used for printing pictures in newspapers, has been found very satisfactory.

Printing processes of the above type being well known, further details thereof are not believed to be required for a full understanding of the invention by the skilled in the art. The only important requirement to keep in mind is the production of "negative" rather than positive halftones or printing blocks for making the imprints of the invention, i.e. the reverse of what is normally required.

The selection of the most suitable invisible ink will depend, in part, on the type of paper and the printing process used. A great many such inks are readily available on the open market.

For instance, Stroblite invisible U.V. inks, sold by the Stroblite Company, New York City, may be used. We have also used an ink containing a mixture of methanol, glycerine, mineral oil, castor oil and an invisible U.V. fast dye, the ingredients being mixed to obtain an ink of the desired consistency.

It will be obvious from the above description of certain preferred embodiments of the invention that it provides a cheap and foolproof method of rapidly identifying a person whose name appears on any valuable instrument. Since the likeness of the person appears positively under ultraviolet radiation, it can be identified at a glance, without difficulty, which is of importance, for instance, for a busy bank teller cashing hundreds of checks during certain banking hours, and which cannot be done with a "negative" likeness, as anyone can readily ascertain by viewing a photographic negative and trying to identify a person on the basis thereof. All that need be done is to place the check under a black light lamp and the picture will appear on the check for comparison with the person cashing the check or, if the invisible identification also includes the payee's signature, the teller will be able to compare the authenticity of the endorsement even if the person cashing the check is not the payee. The same would hold true, of course, for the person presenting a credit card.

Since the preparation of printing blocks is quite cheap, the cost of this method of identification is inexpensive when compared with the million-dollar losses caused by fraudulent check cashers and credit card users. It will be particularly useful in cases where series of checks are issued over a considerable period of time by the same maker to the same payee. For instance, when the government places a person on the social security rolls, it could require that person to forward a photograph and/or a personal description and signature. It would then produce the required printing block and imprint all future checks issued to that person with this invisible identification, at minimal cost. This would obviously also be useful for private pension plans, welfare departments, corporation dividend checks and many other forms of instruments, such as credit cards which would thus be rendered virtually inviolable against unauthorized cashers. It would be an equally simple and inexpensive matter to provide banks and all places of business which honor credit cards or cash checks with ultraviolet lamps so that they may practice the identification method of the present invention.

While the invention has been described in connection with certain preferred embodiments, many modifications and variations may occur to the skilled in the art, particularly after benefiting from the present teaching, without departing from the spirit and scope of the invention as defined in the appended claims.

What is claimed is:

1. A method of identifying a person whose name appears on a valuable instrument, comprising the steps of imprinting a negative likeness of the face of the named person on the instrument in invisible ink which becomes visible when exposed to ultraviolet radiation and exposing the negative imprint to said radiation to produce a visible, positive likeness of the face on the instrument.

2. A method of identifying a person whose name appears on a valuable instrument, comprising the steps of imprinting a negative likeness of the face and a personal description of the named person on the instrument in invisible ink which becomes visible when exposed to ultraviolet radiation and exposing the personal description and the negative imprint to said radiation to produce a visible personal description and positive likeness of the face on the instrument.

3. A method of identifying a person whose name appears on a valuable instrument, comprising the steps of imprinting a negative likeness of the face, a facsimile signature and a personal description of the named person on the instrument in invisible ink which becomes visible when exposed to ultraviolet radiation and exposing the personal description, the facsimile signature and the negative imprint to said radiation to produce a visible personal description, facsimile signature and positive likeness of the face on the instrument.

References Cited in the file of this patent

UNITED STATES PATENTS

| | | |
|---|---|---|
| 493,223 | Schafer | Mar. 7, 1893 |
| 1,374,208 | Jones | Apr. 12, 1921 |
| 1,483,926 | Chadwick | Feb. 19, 1924 |
| 1,911,994 | Edwards | May 30, 1933 |
| 2,073,381 | Sell | Mar. 9, 1937 |
| 2,262,492 | Farrell | Nov. 11, 1941 |
| 2,263,149 | Vargas G. | Nov. 18, 1941 |
| 2,302,645 | Switzer | Nov. 17, 1942 |
| 2,333,329 | Miglarese | Nov. 2, 1943 |
| 2,395,804 | De Gruchy | Mar. 5, 1946 |
| 2,462,735 | Goldwater | Feb. 22, 1949 |
| 2,837,836 | Morawitz | June 10, 1958 |
| 2,896,085 | Hagopian | July 21, 1959 |
| 2,929,931 | Richter et al. | Mar. 22, 1960 |